UNITED STATES PATENT OFFICE.

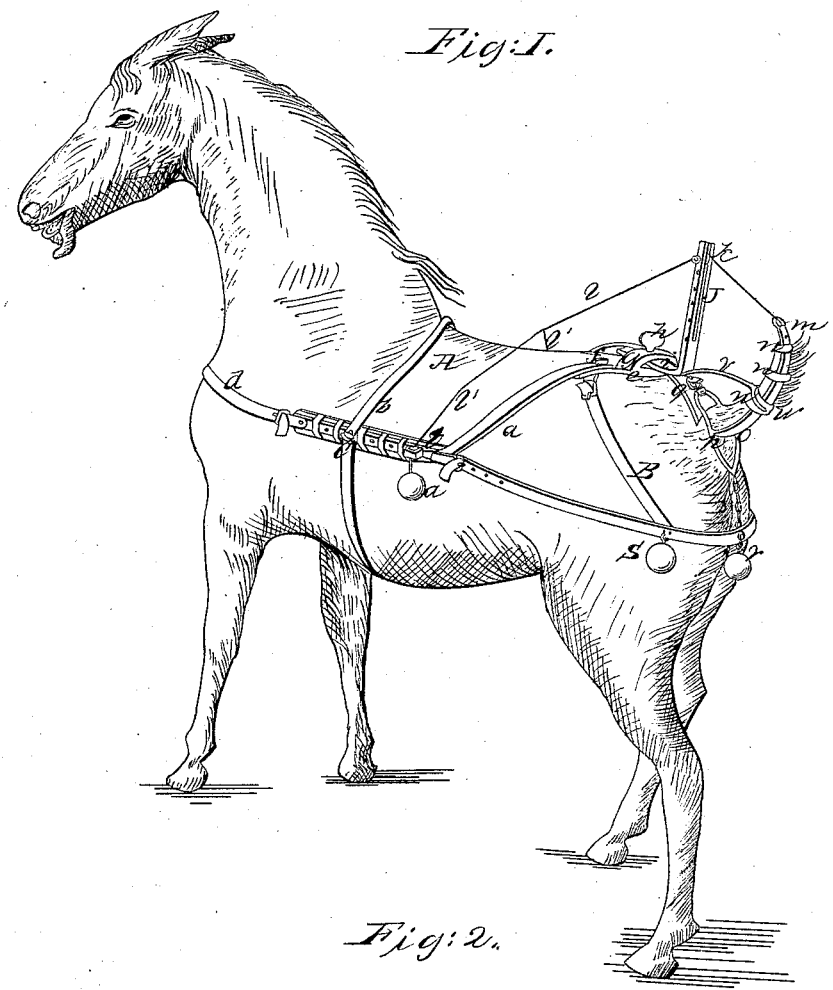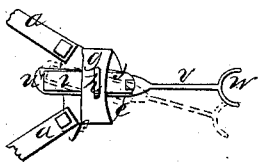

A. H. TREGO, OF LAMBERTVILLE, NEW JERSEY.

APPARATUS FOR PULLEYING HORSES.

Specification of Letters Patent No. 32,801, dated July 9, 1861.

*To all whom it may concern:*

Be it known that I, A. H. TREGO, of Lambertville, in the county of Hunterdon and State of New Jersey, have invented a new and Improved Apparatus or Device for Pulleying Horses; and I do hereby declare that the following is a full, clear, and exact description of the same, reference being had to the annexed drawings, making a part of this specification, in which—

Figure 1 is a view of a horse with my invention applied to it; Fig. 2, a detached plan view of a portion of the invention.

Similar letters of reference indicate corresponding parts in the two figures.

This invention relates to an improved means for keeping the tail of a horse in an elevated state after "nicking" so that the tail may, after being kept elevated a certain period permanently assume such position. The means hitherto employed for such purpose has been, simply, a cord attached to the end of the tail and passing over a pulley on an elevated cross bar at the back of the stall and having a weight secured to its end. This arrangement it will be seen admits of application only when the animal is in his stall, besides it is very trying to the animal greatly interfering with his natural movements, such as lying down, etc.

The object of the within described invention is to obviate this difficulty, and to this end I construct an apparatus which is applied wholly to the animal and so arranged as to keep the tail elevated without at all interfering with the natural movements of the animal the latter being allowed even to run at large with the invention applied to him.

To enable those skilled in the art to fully understand and construct my invention I will proceed to describe it.

A, represents a horse, and B, is a breeching which is placed on the horse and has metal bars $a\ a$, attached to it, one at each side. The lower parts of these bars are perforated and a body band $b$, is attached to them by set screws $c$, the band $b$, passing entirely around the horse. A breast strap $d$, is attached to the front ends of the bars $a\ a$. The bars $a\ a$, are of curved form, as shown clearly in Fig. 1, their back parts extending up to a plate $e$, which rests on the back part of the horse, the bars being secured thereto by bolts $f$. The straps of the breeching as well as the breast strap $d$, are secured to the bars $a\ a$, by buckles so as to admit of the apparatus being applied to any sized horse.

The plate $e$, has a loop $g$, on its upper surface through which a set screw $h$, passes; and bears on a plate $i$, which is fitted in the loop and has an upright $j$, at its back end. In the upper part of this upright a pulley $k$, is fitted or placed over which a cord $l$, passes, said cord being attached at its outer end to a strap $m$, which is bound by straps $n$, to the tail of the horse. The lower end of strap $m$, is attached to a cross bar $o$, of a metal loop $p$, which encompasses the base of the tail and is connected at its upper end by a strap $q$, to the plate $e$. The lower end of loop $p$, is connected to the back part of the breeching and has a weight $r$, attached. Weights $s$, may also be attached to the breeching at different points and the front end of cord $l$, is forked as shown at $l'$, $l'$, the ends passing over pulleys $t$, attached to the bars $a$, $a$, a weight $u$, being attached to each end $l'$.

In the loop $g$, of plate $e$, and underneath plate $i$, of upright $j$, there is fitted a plate $u$, which has a rod $v$, attached, with a forked end $w$. This forked end $w$, of rod $v$, bears against the tail of the horse near its base, and serves to keep the tail raised in a proper position. The weights $u$, $u$, it will be seen keep the tail elevated, and the weights $s$, keep the breeching down in proper position.

After the tail is "nicked" the device is applied to the animal and the forked bar or rod $v$ as well as the upright $j$, are adjusted, either directly in line with the spine of the animal, or to the right, or left as may be required (see Fig. 2,) in order to have the tail adjusted in proper position, the tail if naturally inclining to one side requiring an oblique pull in order to bring it in line with the spine.

From the above description it will be seen that the device will not at all interfere with the natural movements of the animal to which it is applied, as all the parts are connected or applied to the animal only.

I do not confine myself to the precise construction of the parts herein shown and described, for they may be arranged in different ways and the same result attained.

Having thus described my invention what I claim as new and desire to secure by Letters Patent, is,

The employment or use of a breeching B, applied to a horse in connection with bars $a, a$, or their equivalents, an upright or pulley support $j$, and a loaded cord $l$, and forked rod $v$ so arranged as to admit of the pulleying or elevating of the horse's tail substantially as set forth.

A. H. TREGO.

Witnesses:
 WATSON P. TREGO,
 WM. WETHERILL.